July 26, 1955  H. L. PAGE  2,713,721
DENTAL INSTRUMENT
Filed Sept. 15, 1952  5 Sheets-Sheet 1
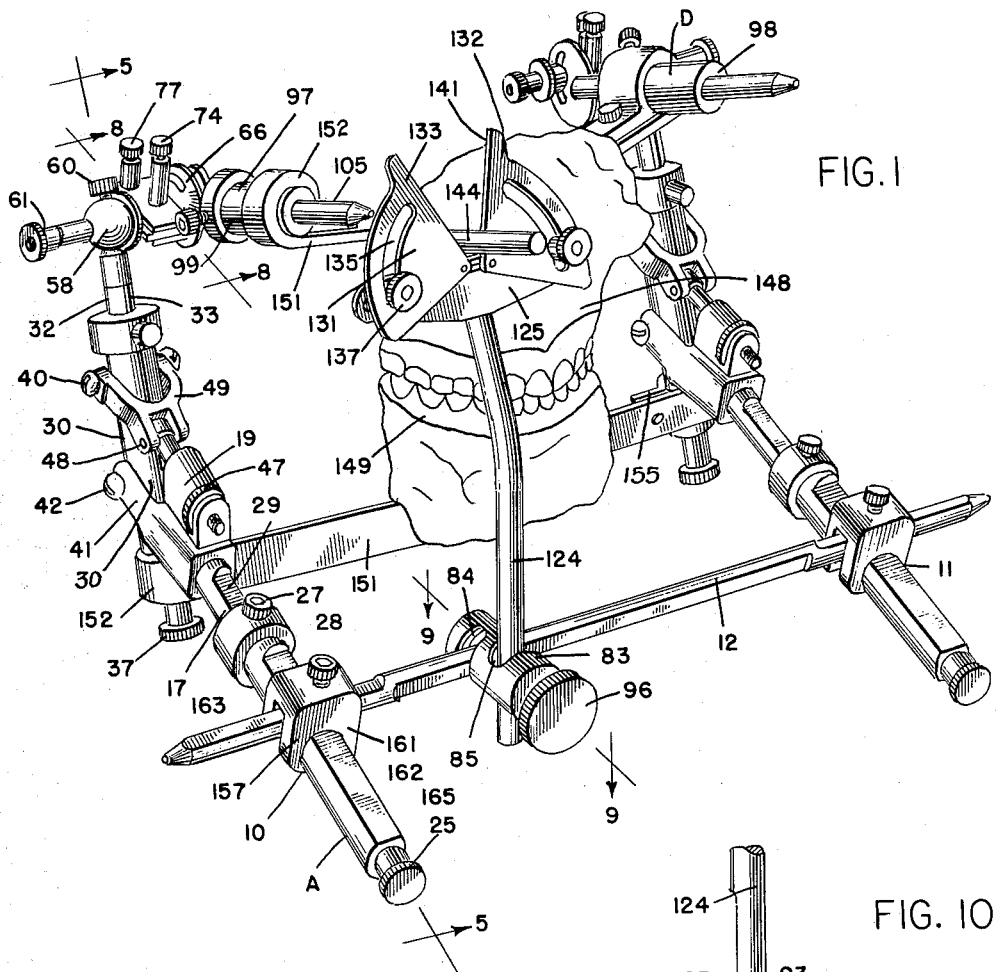
FIG. 1
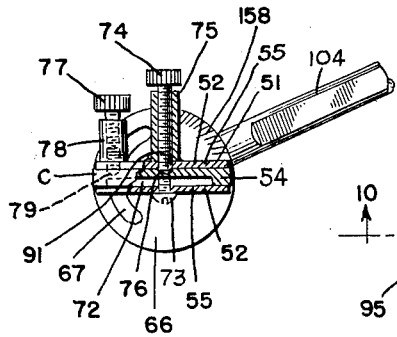
FIG. 8
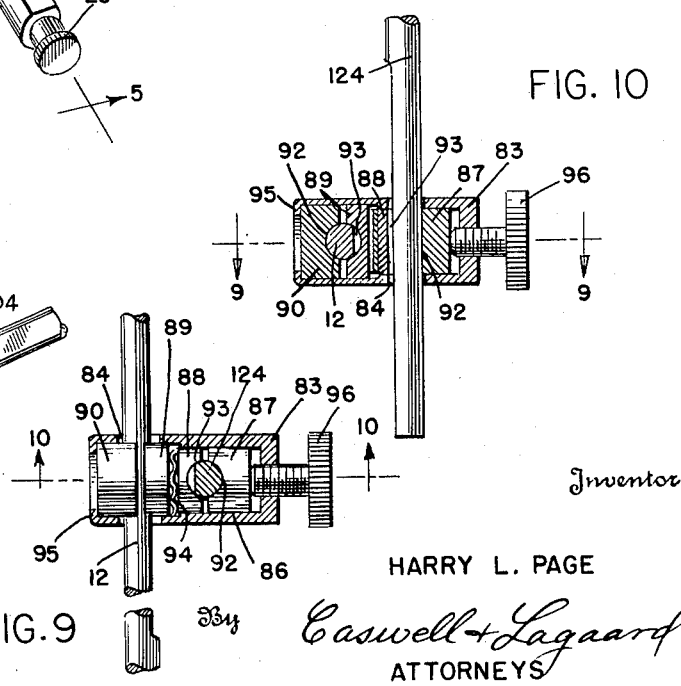
FIG. 10
FIG. 9
Inventor
HARRY L. PAGE
By Caswell + Lagaard
ATTORNEYS

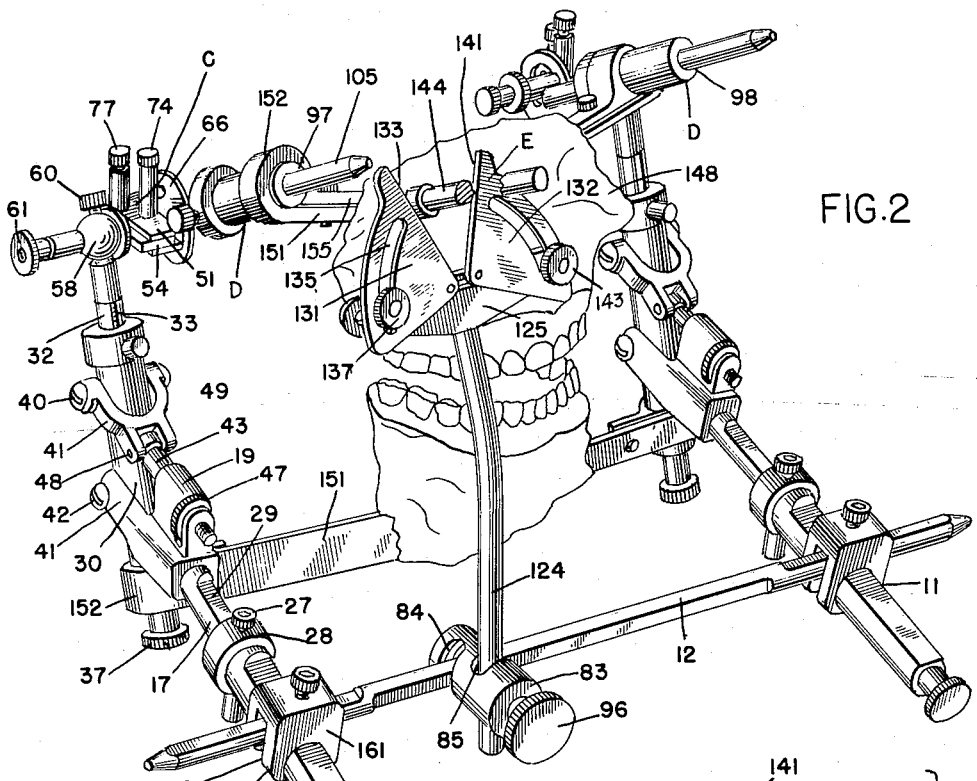
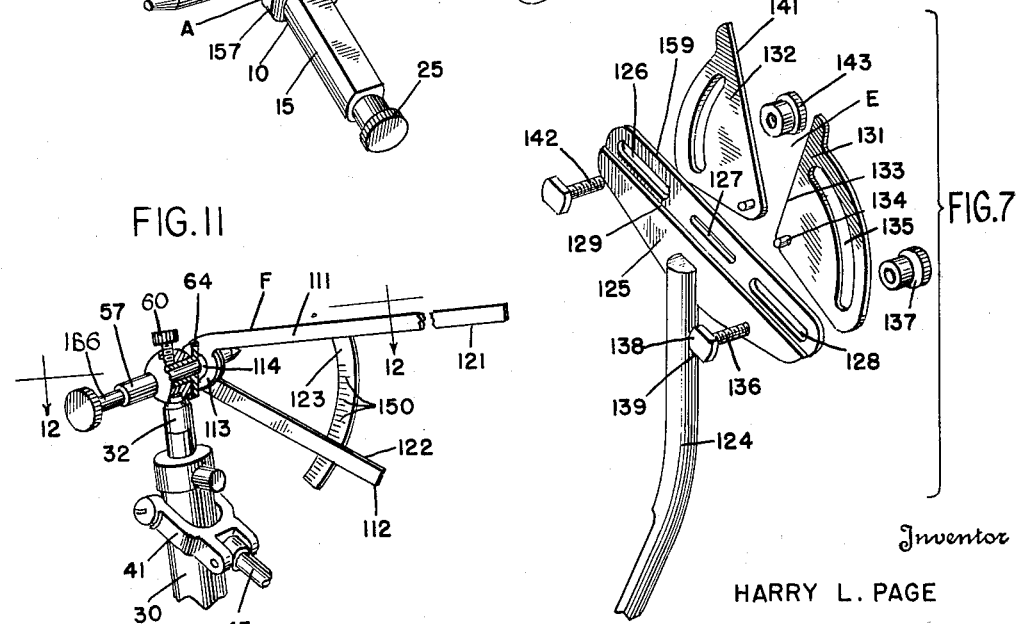

July 26, 1955

H. L. PAGE 2,713,721

DENTAL INSTRUMENT

Filed Sept. 15, 1952

Inventor
HARRY L. PAGE
By Caswell & Lagaard
ATTORNEYS

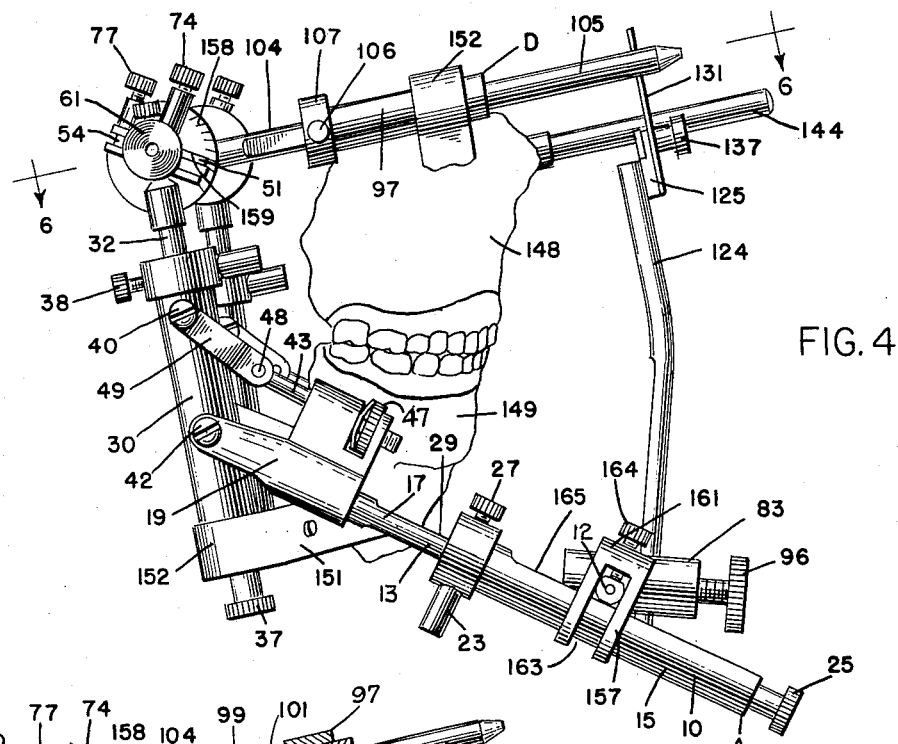
FIG. 4
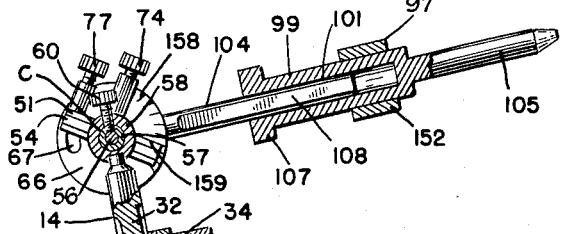
FIG. 5
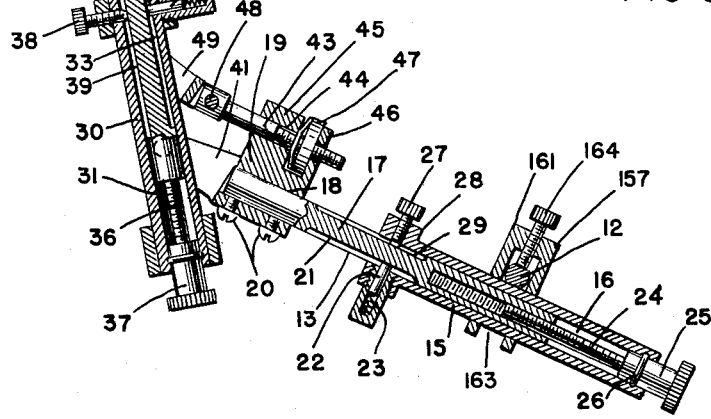

July 26, 1955  H. L. PAGE  2,713,721
DENTAL INSTRUMENT
Filed Sept. 15, 1952  5 Sheets-Sheet 5
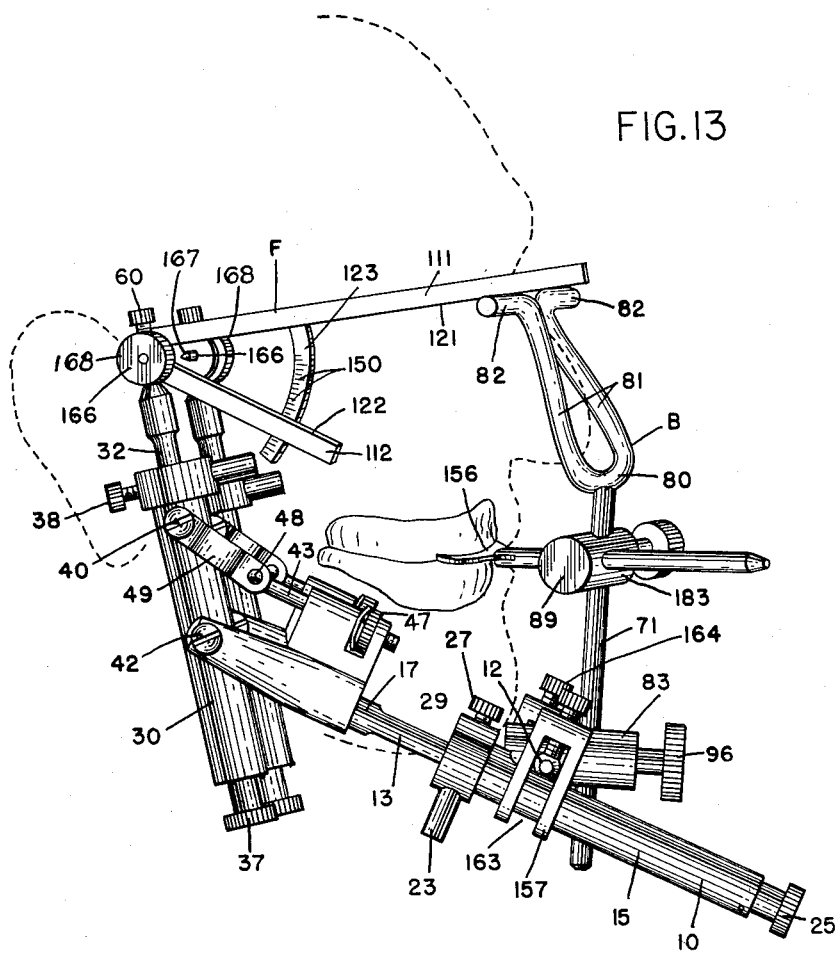
FIG. 13
FIG. 12
INVENTOR
HARRY L. PAGE
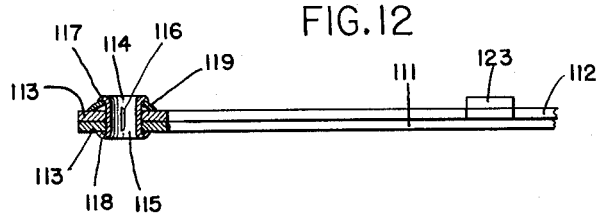
ATTORNEYS United States Patent Office 2,713,721
Patented July 26, 1955

2,713,721

DENTAL INSTRUMENT

Harry L. Page, Valparaiso, Ind., assignor to Transograph, Incorporated, Minneapolis, Minn., a corporation of Minnesota Application September 15, 1952, Serial No. 309,659

16 Claims. (Cl. 32—32)

The herein disclosed invention relates to dental instruments and methods for reproducing and correcting with models, articulation of the human jaws and teeth both natural and artificial, and has for an object to provide an instrument and a method which will accurately record and automatically reproduce in three dimensions simultaneously the kinematic and static relationships of the upper and lower jaws and upper and lower teeth both natural and artificial.

Another object of the invention resides in providing a dental instrument utilizing a hinge bow having adjustable upright arms and on which are attached hinge axis pins and at the locality of which hinge axis joints are employed which will more accurately reproduce relative movement of the human jaws and which support an apposing device carrying the upper jaw model.

An object of the invention resides in providing a joint whereby collateral movements of the jaws, ordinarily known as the Bennett movement, may be actually produced in the instrument.

Another object of the invention resides in providing a hinge axis joint whereby the apposing device of the instrument may slide relative to the jaws or may pivot about the condyle hinge axis or about an axis normal to the sliding surface.

Another object of the invention resides in constructing the joint with a slider pivotally mounted with respect to the hinge bow of the instrument to swing about an axis registering with the corresponding condyle hinge axis of the jaw, and in further providing a slide coacting with said slider and guided for sliding movement in a direction transverse with respect to the condyle hinge axis.

Another object of the invention resides in providing pivot means acting between the slide and slider whereby the slider may swing relative to the slide about an axis transverse with respect to the sliding surface of the slide.

A still further object of the invention resides in providing locking means acting between the slide and slider whereby the parts are held from movement relative to one another.

Another object of the invention resides in attaching the apposing device of the instrument to the slide and in providing adjustment means therebetween whereby the angle between the surface of the slide and the cranial plane of the apposing device can be adjusted.

Another object of the invention resides in providing an instrument by means of which the condylar path may be determined for the purpose of adjusting the relation between the cranial plane of the apposing device and the sliding surface of the slide.

Another object of the invention resides in utilizing a protractor attachable to the instrument and having two relatively pivoted arms adapted to swing about axes coaxial with the axes of the hinge pins and having substantially radial edges and in providing the protractor with graduations for determining the angle between the condyle path and the cranial plane and in using said angle in determining the angular relation between the apposing device and the slide.

Another object of the invention resides in the method of determining the angle between the condyle path and the cranial plane which consists in first determining the condyle hinge axis projection on the patient's face and the translated condyle hinge axis projection on the patient's face, and in determining a reference point on the patient's cranium, and in measuring the angles between the plane containing said point and the condyle hinge axis projections and the lines containing said condyle hinge axis projections and the translated condyle hinge axis projections.

An object of the invention resides in providing an instrument by means of which lateral and closing chewing movements of the human jaws can be accurately simulated.

Another object of the invention resides in utilizing for the purpose a jaw movement guide including a cam having an adjustable upwardly inclined laterally extending cam surface fixed relative to the hinge bow and a cam follower contacting therewith engaging said cam surface and carried by the apposing device of the instrument.

Another object of the invention resides in constructing said jaw movement guide with a standard mounted on the hinge bow and having a cross bar, and in further pivoting the cam to the cross bar.

A still further object of the invention resides in providing locking means whereby the cam may be locked in any suitable position with reference to the cross bar.

Other objects of the invention reside in the novel combination and arrangement of parts and in the details of construction hereinafter illustrated and/or described.

In the drawings:

Fig. 1 is a perspective view of a dental instrument illustrating an embodiment of the invention and showing the jaw movement guide applied thereto with the cam follower in one position.

Fig. 2 is a view similar to Fig. 1 showing the cam follower in an altered position.

Fig. 4 is a side elevational view of the structure shown in Fig. 1.

Fig. 5 is an elevational cross sectional view taken substantially on line 5—5 of Fig. 1.

Fig. 7 is a perspective view of the jaw movement guide detached from the instrument and showing the parts separated from one another.

Fig. 8 is an elevational sectional detail view taken on line 8—8 of Fig. 1.

Fig. 9 is a plan sectional detailed view of one of the connectors used with the invention taken on lines 9—9 of Figs. 1 and 10.

Fig. 10 is an elevational sectional view taken on line 10—10 of Fig. 9.

Fig. 11 is a perspective view of a portion of the upright arm of one of the side frames of the hinge bow with the condyle path protractor applied thereto.

Fig. 12 is a sectional detail view taken on line 12—12 of Fig. 11.

Fig. 13 is a side elevational view of the instrument with the condyle path protractor applied thereto and showing the method of using the instrument on the patient's head.

Figure 3:
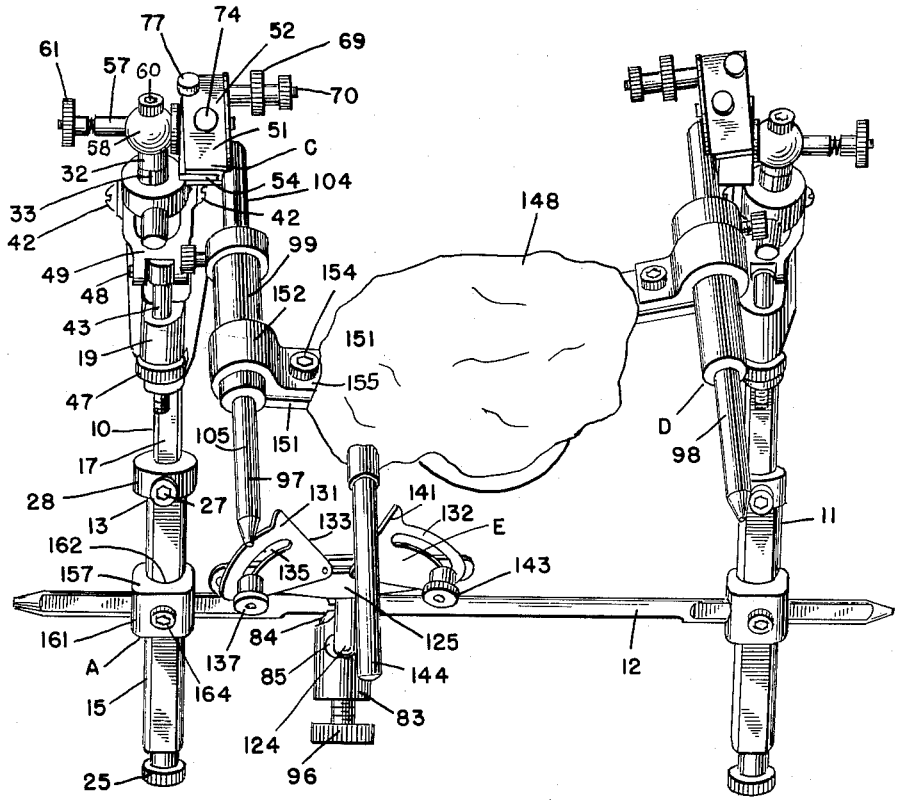
Fig. 3 is a plan view of the structure shown in Fig. 2.

The construction shown in the drawings comprises a hinge bow A consisting of two side frames connected to a cross bar. These side frames adjustably support hinge axis pins which, when the device is mounted in the patient's mouth, may be adjusted to register with the projections of the condylar hinge axis on the patient's face or the translated condylar hinge axis projections when the patient's lower jaw is fully open. Associated with the hinge bow is a head relator B which may be adjustably mounted on the hinge bow and which includes a bite fork adapted to be attached to bite blocks or a wax bite mounted in the patient's mouth and which serves to support the entire instrument thereby. The head relator includes two rests adapted to correspond with certain prominences or convenient anatomical reference points of the patient's cranium whereby the instrument may be properly oriented with reference to the natural symmetries and/or asymmetries of the skull and of the mandible. After the instrument has been removed from the patient's mouth an apposing device D is employed which is pivoted to the frames of the hinge bow by means of condyle hinge joints C which permit pivotal movement about the condyle hinge axes, sliding movement in planes parallel to the condyle hinge axes and pivotal movement about axes normal to such planes. For the purpose the joints are constructed with slides mounted on pins rotatable about the condyle hinge axes. Sliders coacting with the slides and slidable relative thereto are attached to the apposing device. Acting between each slide and slider is a journal and bearing which may be brought together to permit of rotation about an axis normal to the plane of the sliding surface of the slide and slider or which may be separated to permit of free sliding. In addition, a locking device is provided for each hinge joint whereby the joint may be restrained from sliding movement or rotation about the normal axis. The apposing device and the hinge bow carry mounting fingers for attachment of jaw models to the instrument while the jaw models are in engagement with the bite blocks or a wax bite and thus maintain proper relation between the models and bite blocks or wax bite. Mounted on the hinge bow is a jaw movement guide E which consists of a standard having a cross arm formed with two slots. In these slots are pivotally mounted two segmental-shaped cams having obliquely disposed cam surfaces. These cams are further formed with arcuate slots registering with the slots in the cross bar. Through these slots extend screws and by means of which the angularity of the cam surfaces of the cams may be adjusted. A cam follower attached to the upper model or to the apposing device operates in conjunction with the said cams so that when the journals of one of the joints is in engagement with its bearing and the journal of the other of said joints is disconnected therefrom, the apposing device may simulate medial and closing movement of the jaws. The condyle hinge joints are provided with adjusting means whereby the angularity of the sliding surfaces of the slide and slider may be adjusted relative to the cranial plane. To determine such angle, a condyle path protractor F is employed which comprises two relatively movable arms pivoted together about an axis coinciding with the condyle hinge axis. This device is mounted on the apposing device and one of the arms caused to register with the cranial plane and the other to register with the translated condylar hinge axis projection.

A hinge bow A consists of two side frames 10 and 11 which are identical in construction and which are attached to a cross bar 12 by means of connectors 157. These frames being of the same construction, only the frame 10 will be described, and which is shown in detail in Fig. 5. This frame consists of a horizontal arm 13 and to which is pivotally connected an upright arm 14. The horizontal arm comprises a barrel 15 which is formed with a bore 16. Slidably mounted in the bore 16 is a stem 17 which is received in a socket 18 formed in a clevis 19. Set screws 20 hold the said stem rigidly attached to the clevis. The stem 17 is constructed with a flat 21 which engages a pin 22 carried by the barrel 15 and slidably mounted for movement in a direction transverse to the axis thereof. Pin 22 is urged by means of a spring 23 into engagement with the flat 21 and thus prevents rotation of the stem 17 while allowing translatory movement thereof. The other end of the stem 17 is tapped to receive a threaded screw 24 which has a head 25 disposed in the outer end of the bore 17 and held from endwise movement by means of a snap ring 26. By rotating the screw 24, the stem 17 and the clevis 19 attached thereto may be moved longitudinally within the bore 16 to shift the clevis 19 with reference to the barrel 15. A lock screw 27 screwed into a boss 28 on the barrel 15 engages another flat 29 formed on the stem 17 and serves to lock the parts from movement.

The upright arm 14 consists of a barrel 30, similar to the barrel 15, and which is formed with a bore 31. In this bore is slidably mounted a stem 32 which is formed with a flat 33. A pin 34, similar to the pin 22, engages said flat and restrains rotation of the stem with reference to the barrel. The inner end of the stem 32 is tapped to receive a screw 36 which has a head 37, similar to the screw 24, and which operates in identically the same manner. A lock screw 38 engaging a flat 39 on said stem locks the stem in adjusted position.

The upright arm 14 is hingedly connected to the horizontal arm 13 by means of the clevis 19. This clevis is formed with two legs 41 which straddle the barrel 30. Screws 42 screwed in said legs and engaging sockets in the barrel 30 pivotally attach the arm 13 to the arm 14. The angularity between the arms 13 and 14 may be adjusted by means of an adjusting screw 43. This screw extends through a bore 44 in a post 45 formed on clevis 19. This post has a kerf 46 in it and in which is mounted a nut 47 screwed on screw 43 and which moves the adjusting screw longitudinally with respect to the bore 44. The adjusting screw 43 is pivoted by means of a pintle 48 to a link 49 pivoted to the barrel 30 by means of screws 40. The screws 24 and 36 form adjustments by means of which the stem 32 may be adjusted vertically and horizontally and the nut 47 and screw 43 serve to additionally adjust said stem horizontally.

Each of the connectors 157 consists of a body 161 formed with a bore 162 adapted to receive the barrel 15 of the arm 13 of the side frames 10 and 11. A kerf 163 in said body receives the cross bar 12 which lies upon a flat 165 on barrel 15 and a screw 164 screwed in said body and engaging said cross bar clamps the parts together.

Figure 6:
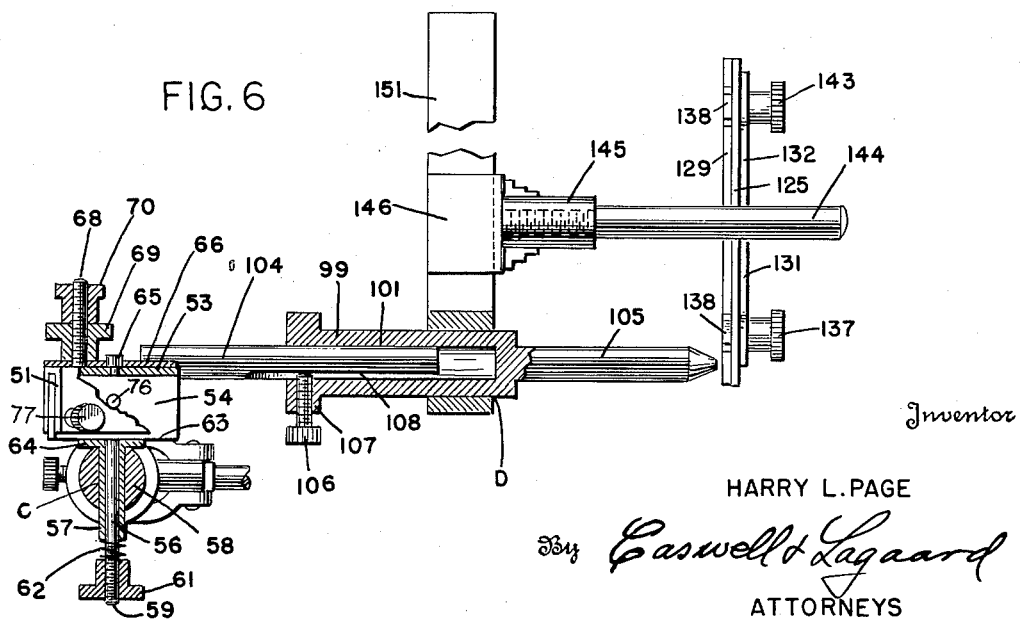
Fig. 6 is a plan sectional view taken on line 6—6 of Fig. 4.

At the upper end of the stem 32 of arm 14 of frame 10 is mounted the condylar hinge joint C. This hinge joint is best shown in Figs. 5, 6 and 8. The said hinge joint comprises a slider 51 which is constructed with two spaced plates 52 having a connecting portion 53 therebetween. These two plates are adapted to straddle a slide 54 which is also plate-like in form and somewhat thicker than the plates 52. In the form of the invention shown, the said slide 54 engages the facing surfaces 55 of the slider 51 which guide the said slider for translatory movement in the planes of these surfaces. The slide 54 has brazed to it a pintle 56 which is journaled in a bearing 57 mounted in a ball 58 which is attached to the upper end of the stem 32 of arm 14. The bearing 57 is removably mounted in the ball 58 and is detachably secured in position therein by means of a set screw 60. The pintle 56 is threaded at its outer end as indicated at 59 to receive a nut 61. Between the said nut and the end of the bearing 57 is a compression coil spring 62 which urges the edge 63 of the slide 54 against a flange 64 formed on the bearing 57. This construction takes up the play in the joint and maintains the slide 54 in proper position with reference to the side frame 10. The said spindles and bearings constitute hinge means for supporting the apposing device D for swinging movement about the condyle hinge axes.

The connecting portion 53 of slider 51 has issuing outwardly from it a trunnion 65. On this trunnion is rotatably mounted an adjusting disc 66. This adjusting disc is constructed with an arcuate slot 67. The connecting portion 53 of the slider 51 has attached to it and issuing outwardly therefrom an adjusting screw 68. This screw is adapted to extend through the slot 67 of the disc 66. A nut 69 and a lock nut 70 mounted on this screw serve to hold the disc in adjusted position relative to the slide and slider.

For the purpose of maintaining the slide 54 in engagement with the slider 51, the said slide is constructed on the underside thereof, as shown in Fig. 8, with a groove 72 which terminates short of the ends of said slide. A screw 73 screwed in the lowermost plate 52 of slider 51 is received within this groove and limits the movement of the slider with reference to the slide. These parts serve as restraining means to prevent disengagement of the parts.

The slider 51 may pivot relative to the slide 54 about an axis at right angles to the surfaces 55 of the slide 54. This is accomplished by hinge means consisting of a screw 74 which is screwed into a boss 75 issuing outwardly from the upper plate 52 of the slider 51. The lower end of said screw serves as a journal which enters a bearing 76 in the upper surface of the slide 54 and when received therein pivotally supports the parts for rotating movement about the axis thereof. The axis of the screw 74 is at right angles to the surface 55. A similar screw 77 screwed in a boss 78 engages a socket 79 in the slide 54 and together with the screw 74 locks the parts from movement.

The head relator B of the instrument is shown in detail in Fig. 13. This head relator comprises a nasal bearing member 80 which is attached to the upper end of an upright or rod 71. This member is of inverted U-shape formed to straddle the nose of the patient and is constructed with spaced inverted legs 81 forming an opening therebetween through which the nose of the patient may project. Issuing outwardly from the legs 81 are two rests 82 which are disposed in alignment with one another. The legs 81 and the rests 82 may be constructed from a length of rod bent into the desired form which is brazed to the upright 71. The upright 71 is adapted to be attached to the cross bar 12 by means of a connector 83. This connector is shown in detail in Figs. 9 and 10. This connector is formed with two openings 84 and 85 at right angles to one another. The rod 71 extends through the opening 85 while the cross bar 12 extends through the opening 84. The connector 83 is formed with a bore 86 in which are received four jaw members 87, 88, 89 and 90. These jaw members are constructed with semi-circular grooves 92 and 93 which engage the said cross bar and upright and clamp the parts together. Between the jaw members 88 and 89 is a crinkle spring 94. The jaw member 90 is engaged by a flange 95 turned over from the outermost portion of the connector and serves to maintain the parts within the bore 86. A thumb screw 96 screwed into the end of the connector engages the jaw member 87 and forces all of the parts together to securely hold the upright fixed relative to the cross bar 12.

The apposing device D consists of two arms 97 and 98. Both of these arms are similar in construction and only the arm 94 will be described. This arm has a barrel 99 which is formed with a bore 101. Received in this bore is a rod 104. The rod 104 is brazed or welded to the adjusting disc 66 as best shown in Fig. 6. The rod 104 may be held slidably mounted in the bore 101 by means of a set screw 106 screwed in a boss 107 formed on the barrel 99 and engaging a flat 108 on said rod. Issuing outwardly from the outer end of the barrel 99 is a contactor 105 which is adapted to engage one of the rests 82 of the head relator B.

In the drawings an upper jaw model 148 and a lower jaw model 149 have been shown. These jaw models are attached to the apposing device D and to the hinge bow A by attaching means consisting of mounting fingers 151. The said fingers have loops 152 which receive the barrels 99 of the apposing device and the barrels 30 of the arms 14 of the hinge bow. The said fingers are clamped to the said barrels by means of clamping screws 154 which extend through said fingers and through extensions 155 on the ends of loops 152. These fingers become imbedded in the cementing material used for mounting the models on the instrument.

For determining the proper angle between the surfaces 55 of slide 54 and slider 51 and the cranial plane of the apposing device D, the condyle path protractor F is employed. This protractor is best shown in Figs. 11 and 12 and its application is illustrated in Fig. 13. The protractor F is preferably used with one of a pair of condyle hinge pins 166 such as disclosed in my copending application for patent, Serial Number 214,234, now Patent No. 2,701,915 used for determining the hinge axis projection on the patient's face and which pin is inserted in the bore of the bearing 57 of one of the condylar hinge joints C. These pins have points 167 at their inner ends and heads 168 at their outer ends and by means of which heads they may be manipulated. The said protractor comprises a cranial plane arm 111 and a condyle path arm 112. The said arms have heads 113 which are bored to receive a tubular bearing 114. This bearing has a bore 115 which is of a diameter to snugly receive the shank of the condyle hinge pin 166. The said bearing is formed with slits 116 which give resiliency to the bearing and which permit the bearing to be frictionally held supported on the hinge pin. The ends of the bearing 114 are turned over to form shoulders 117 and 118. The shoulder 118 engages the head 113 of arm 112 while the shoulder 117 engages a spring 119 encircling said bearing and pressing against the head 113 of arm 111. By means of this construction the arms are frictionally held in adjusted position and may readily be rotatable relative to one another and will remain in adjusted position. The arm 111 is formed with an edge 121 which is offset from a radius passing through the axis of the bearing 114 by an amount equal to one-half the diameter of the contactor 105. The arm 112 is constructed with an edge 122 which lies along a radius having as its center the axis of the bearing 114. Attached to the arm 111 is a scale 123 which is formed with graduations 124 calibrated to indicate the angularity between the radius of edge 122 of arm 112 and the radius to which the edge 121 of arm 111 is parallel.

The jaw movement guide E is best shown in Figs. 1 and 7. This guide includes a standard 124 which has attached to the upper end of the same a cross bar 125. This cross bar has formed in it three aligning slots 126, 127 and 128. Adjacent to and parallel with these slots is a shoulder 129 which extends throughout the length of the cross bar. In conjunction with the said cross bar two cams 131 and 132 are employed which are identical in construction excepting that the one is left-handed and the other right-handed. For this reason only the cam 131 will be described in detail. This cam is segmental-shaped in form and has an edge 133 which serves as a cam surface. At the vertex of the said cam is provided a trunnion 134 which extends outwardly therefrom. This trunnion is adapted to be received in the slot 127 and is slidable and rotatable therein. Concentric with the axis of the trunnion 134 is formed in the cam 131 an arcuate slot 135 which is adapted to overlie the slot 128. A screw 136 is adapted to extend through the slot 128 and the slot 135 and has a nut 137 screwed on the end of the same and which serves to clamp the parts together. To prevent rotation of the said screw the head 138 of said screw is formed with a flat 139 which engages the shoulder 129. The cam 132 has a cam surface 141 which corresponds with the cam surface 133 and similarly is provided with a screw 142 on which is screwed a nut 143. It will readily be comprehended that the cams may be moved from and toward one another and that the same may be rotated on the trunnion 134 to adjust the angularity of the cam surfaces 133 and 141 and the proximity of said surfaces to one another. Operating in conjunction with the cams 131 and 132 is a cam follower 144. This follower is in the form of a rod which is attached to the apposing device D or to any part movable therewith. In the construction shown in Fig. 6 the cam follower 144 is attached to a head 145 which is constructed at the end of the same with a yoke 146. This yoke is adapted to straddle one of the mounting fingers 151 used to attach the upper jaw model to the apposing device. When the model is attached the said head and yoke are imbedded in the cement or gypsum used to mount the model and thus held firmly attached to the apposing device.

The method of using the invention is as follows: With the lower jaw in retrusive position, the projections of the condylar hinge axes of the patient's condyles on his face are determined by the use of the hinge bow A and suitable hinge pins 166, or in any other suitable manner. Similarly, with the lower jaw open, the translated condylar hinge axis projections are determined and marked on the patient's skin. Bite blocks, if the patient is edentulous, or wax bites, if the patient is dentulous, are then mounted in the patient's mouth and the instrument attached to the same by means of the bite fork 156. The bite fork 156 is then applied to the rod 71 of the head relator B and the said head relator adjusted to bring the rests 82 at the proper position with reference to the head of the patient. The hinge bow A is now applied to the head relator B which is accomplished by inserting the rod 71 into the connector 83 and through the opening 85 of said connector. The parts are then temporarily secured in approximate position by tightening up the thumb screw 96. The side frames 10 and 11 are next adjusted in position with reference to the cross bar 12 by connectors 157 and condyle hinge pins 166 inserted in the bearings 57 instead of the hinge joints C. The points 167 of these pins are then caused to register with the condyle hinge axis projections on the patient's face when the lower jaw is in retrusive position by means of the adjusting screws 25, 37 and the adjusting nut 47. The translated condylar hinge axis projections are determined by the localities on the patient's face at the points of the hinge pins when the patient's lower jaw is open. After the hinge axes pins have been properly positioned the condyle path protractor is first mounted on one of the hinge pins and the cranial plane arm 111 adjusted until the edge 121 thereof rests on one of the rests 82 of the head relator B. The other arm 112 is then rotated until the translated condylar hinge axis projection on the patient's face registers with the edge 122 of said arm. The scale 123 is then read and the angle between the cranial plane and the condyle path is thus determined and noted. The procedure is repeated for the other side and the corresponding angle noted. The instrument is then removed from the patient's head. The apposing device is next applied to the instrument. This is accomplished by substituting for the hinge pins 166 the condylar hinge joints C with the apposing arms 97 and 98 attached thereto. In so doing pintles 56 are inserted into the bearings 57 and the nut 61 and springs 62 applied to the threaded ends 59 of the same. The graduations 158 on the adjusting discs 66 are arranged when registering with the upper surface of the plates 52 to indicate the angle between the cranial plane and the surfaces 55 of the slide 54. Nuts 69 and 70 are next loosened and the said discs adjusted until the angles determined by the condyle path protractor exist between the cranial plane of the apposing device and the surfaces 55. The parts are then locked in position. Jaw models are then applied to the wax bite or bite blocks and secured to the instrument by cementing material enveloping the mounting fingers 151 and secured to the models. At the time the jaw models are being attached to the instrument cam follower 144 is also mounted by causing the yoke 146 thereof to straddle one of the fingers 151 of the apposing device D. The same is then imbedded in the cement with the said finger and becomes rigidly attached to the apposing device. Thereafter the bite fork is heated and removed from the wax bite or bite blocks and the head relator and bite fork removed from the instrument. The teeth are now set up in the wax in the customary manner. The jaw movement guide E is now attached to the instrument by use of the connector 83. Standard 124 of the instrument is inserted in the opening 85 of said connector and adjusted until the upper edge 159 of the cross bar 125 of said jaw movement guide comes in close proximity to the cam follower 144 but just clears the same and with the cross bar extending transversely of said follower. The cams 131 and 132 are next brought into contact with the said follower and the angularity of the same adjusted in accordance with pantographs previously made of the patient's medial and closing mandibular movements. The journal 91 of screw 74 is left in contact with the bearing 76 of the hinge joint C of side frame 10 and the screw 77 disengaged from socket 79 to allow the slide 54 to pivot with reference to the slider 51. At the same time the screws 74 and 77 of the hinge joint C of frame 11 are disengaged from the corresponding bearings and socket so that the slider 51 may slide relative to the slide 54. The cam follower 144 is now caused to travel along the cam surface 141 of cam 132 and the interdention of the cusps of the teeth noted. If interference is encountered, correction is made until interference is absent. The procedure is then reversed and the cam follower 144 caused to travel along the cam surface 133 of cam 131 and the position of the teeth again corrected until interference of the cusps is absent. After the teeth have been properly set up the dentures are processed in the laboratory in the customary manner. The processed dentures are subsequently then put back in the instrument and the instrument used as an articulator to determine any change in interdention due to processing errors. If any occur, such errors are corrected by repeating the process and grinding off the cusps where interference occurs. After the dentures have been so prepared, the same are removed from the instrument and placed in the patient's mouth for permanent use.

The advantages of the invention are manifest. Well fitting dentures are readily procured and traumatogenic malocclusion is avoided.

Changes in the specific form of the invention, as herein described, may be made within the scope of what is claimed without departing from the spirit of the invention.

Having described the invention, what is claimed as new and desired to be protected by Letters Patent is:

1. In combination, a hinge bow having spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frames having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis and a similar joint between the other frame and arm situated at the locality of the condyle hinge axis thereof.

2. In combination, a hinge bow having spaced frames, attaching means mounted on the hinge bow and attaching the hinge bow to a lower jaw model, an apposing device having spaced arms, attaching means mounted on the apposing device and attaching the apposing device to an upper jaw model corresponding with the lower jaw model, said arms and frames having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis, hinge means between said slide and slider and having an axis at substantially right angles to said surface and a similar joint between the other frame and arm situated at the locality of the condyle hinge axis thereof.

3. In a condyle hinge joint for an articulator having parts carrying jaw models and movable relative to one another about a condyle hinge axis, a slide carried by one of the parts of the articulator and having a surface, one element of which extends substantially parallel to the condyle hinge axis of the articulator, a slider slidable with reference to said surface and carried by the other part of the articulator, retaining means for retaining said slider in sliding relation with reference to said surface, hinge means for guiding one of said parts for swinging movement about said condyle hinge axis and means for locking said slider from movement relative to said slide.

4. In a condyle hinge joint for an articulator having parts carrying jaw models and movable relative to one another about a condyle hinge axis, a slide carried by one of the parts of the articulator and having a surface, one element of which extends substantially parallel to the condyle hinge axis of the articulator, a slider slidable with reference to said surface and carried by the other part of the articulator, retaining means for retaining said slider in sliding relation with reference to said surface, hinge means for guiding one of said parts for swinging movement about said condyle hinge axis, hinge means between said slide and slider and having an axis at substantially right angles to said surface.

5. In a condyle hinge joint for an articulator having parts carrying jaw models and movable relative to one another about a condyle hinge axis, a slide carried by one of the parts of the articulator and having a surface, one element of which extends substantially parallel to the condyle hinge axis of the articulator, a slider slidable with reference to said surface and carried by the other part of the articulator, retaining means for retaining said slider in sliding relation with reference to said surface, hinge means for guiding one of said parts for swinging movement about said condyle hinge axis, a condyle path adjustment carried by one of said parts for varying the angularity of said surface with reference to a plane containing the condyle hinge axis and any fixed portion of the apposing device other than said axis.

6. In a condyle hinge joint for an articulator having parts carrying jaw models and movable relative to one another about a condyle hinge axis, a slide, plate-like in form having spaced parallel surfaces substantially parallel to the condyle hinge axis and carried by one of said parts, a slider U-shaped in form receiving said slide and guided for movement by the surfaces thereof, pivot means for guiding said slide and slider for swinging movement about the condyle hinge axis of the articulator, retaining means for retaining said slider in sliding relation relative to the slide and means for locking said slider from movement relative to said slide.

7. In a condyle hinge joint for an articulator having parts carrying jaw models and movable relative to one another about a condyle hinge axis, a slide, plate-like in form having spaced parallel surfaces substantially parallel to the condyle hinge axis and carried by one of said parts, a slider U-shaped in form receiving said slide and guided for movement by the surfaces thereof, pivot means for guiding said slide and slider for swinging movement about the condyle hinge axis of the articulator, retaining means for retaining said slider in sliding relation relative to the slide, pivot means for guiding said slider for movement about an axis transverse to said surfaces and means for locking said slide from movement relative to said slide.

8. In a condyle hinge joint for an articulator having parts carrying jaw models and movable relative to one another about a condyle hinge axis, a slide, plate-like in form having spaced parallel surfaces substantially parallel to the condyle hinge axis and carried by one of said parts, a slider U-shaped in form receiving said slide and guided for movement by the surfaces thereof, pivot means for guiding said slide and slider for swinging movement about the condyle hinge axis of the articulator, retaining means for retaining said slider in sliding relation relative to the slide, a post attached to said slider and having a bore whose axis is transverse to said surfaces, said post being formed with threads, a threaded pintle received in said bore and engaging said threads, a journal formed at the end of said pintle and a bearing in said slide adapted to receive said journal and means for locking said slider from movement relative to said slide.

9. In a condyle hinge joint for an articulator having parts carrying jaw models and movable relative to one another about a condyle hinge axis, a slide carried by one of the parts of the articulator and having a surface, one element of which extends substantially parallel to the condyle hinge axis of the articulator, a slider slidable with reference to said surface and carried by the other part of the articulator, retaining means for retaining said slider in sliding relation with reference to said surface, hinge means for guiding one of said parts for swinging movement about said condyle hinge axis, a condyle path adjustment carried by one of said parts and including a plate, pivot means between said plate and slider, and having its axis parallel with the condyle hinge axis, said plate having an arcuate slot therein coaxial with the axis of said pivot means and locking means extending through said slot and engaging said slider.

10. In combination a hinge bow having side frames including horizontal and upright arms adjustably connected together and fixed relative to the upper jaw of the patient, hinge axis pintles, guides at the upper ends of said upright arms for supporting said hinge axis pintles at the condylar hinge axis projections of the patient, a head relator mounted on said hinge bow and having rests, a condyle path protractor having two arms adapted to be pivoted relative to each other about the axis of the hinge axis pintles, one of said arms having a radial edge adapted to engage said rests and the other of said arms having a radial edge adapted to register with the translated condyler hinge axis projections and a graduated scale for indicating the angle between the edges of said arms.

11. The method of procuring the angles between the cranial plane and the condyle paths of a patient which consists in locating the condyle hinge axis projections on the patient's face when the lower jaw is in retrusive position, in determining the translated condylar hinge axis projections on the patient's face when the lower jaw has been translated to fully open position, in applying a protractor having two pivoted arms with radial edges and a graduated scale to one side of the patient with the axis of the arms at the corresponding condylar hinge axes projection when the patient's jaw is in retrusive position, in bringing the radial edge of one of said arms into coincidence with the cranial plane, in shifting the other arm to bring the radial edge thereof into register with the corresponding translated condylar hinge axis projection, the angle between said edges of the scale being one of the desired angles and in repeating the method for the other side of the patient's face.

12. The method of procuring the angles between the cranial plane and the condyle paths of a patient which consists in locating the condyle hinge axis projections on the patient's face when the lower jaw is in retrusive position, in determining the translated condylar hinge axis projections on the patient's face when the lower jaw has been translated to fully open position, in applying to the patient a dental instrument having a hinge bow provided with hinge axis pintles registering with the condylar hinge axis projections when the patient's jaw is in retrusive position and with a head relator having rests disposed in the cranial plane, in attaching to the instrument a protractor having two pivoted arms with radial edges and with a graduated scale and with the axes of the arms at one of the hinge pintle axes, in bringing the radial edge of one of said arms into engagement with one of the rests, in shifting the other arm to bring the radial edge thereof into register with the translated condylar hinge axis projection, the angle between said edges of the scale being one of the desired angles and in repeating the method with the protractor at the other hinge axis pintle.

13. In combination, a hinge bow having spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frames having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis, a bearing and a journal cooperating therewith, one thereof being carried by said slide and the other by said slider, the axis of said bearing and journal being substantially at right angles to said surface, said journal and bearing being relatively axially slidable to engage or disengage the journal from the bearing and a similar joint between the other frame and arm situated at the locality of the condyle hinge axis thereof.

14. In combination, a hinge bow having spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis, a bearing and a journal cooperating therewith, one thereof being carried by said slide and the other by said slider, the axis of said bearing and journal being substantially at right angles to said surface, said journal and bearing being relatively axially slidable to engage or disengage the journal from the bearing and a similar joint between the other frame and arm situated at the locality of the condyle hinge axis thereof, a cam carried by said hinge bow and a cam follower carried by said apposing device and movable along said cam, said follower causing the jaw models to similate chewing movement of the patient's jaw in closing when the cam surface is disposed in correspondence with the path of movement of the jaw in closing and when the journal of the joint on the chewing side of the instrument is in engagement with its bearing and when the journal of the other joint is disengaged from its bearing.

15. In combination, a hinge bow having spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis, a bearing and a journal cooperating therewith, one thereof being carried by said slide and the other by said slider, the axis of said bearing and journal being substantially at right angles to said surface, said journal and bearing being relatively axially slidable to engage or disengage the journal from the bearing and a similar joint between the other frame and arm situated at the locality of the condyle hinge axis thereof, a standard extending upwardly from said hinge bow, a cross bar carried by said standard, a cam having a cam surface and pivoted to the cross bar, said cam being adjustable to move said surface from a substantially horizontal transverse position to an upwardly inclined position and a cam follower carried by said apposing device and following along said cam surface.

16. In combination, a hinge bow having spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the condyle hinge axes, a hinge joint for one arm and frame and including a condyle slide carried by one of said parts, said slide having a guide surface lying in a plane substantially parallel with the condyle hinge axis of said parts, a slider attached to the other of said parts, retaining means for retaining said slider in sliding relation with reference to said surface, said condyle hinge joint including hinge means for guiding said apposing device for swinging movement about the condyle hinge axis, a bearing and a journal cooperating therewith, one thereof being carried by said slide and the other by said slider, the axis of said bearing and journal being substantially at right angles to said surface, said journal and bearing being relatively axially slidable to engage or disengage the journal from the bearing and a similar joint between the other frame and arm situated at the locality of the condyle hinge axis thereof, a standard extending upwardly from said hinge bow, a cross bar carried by said standard, and having a transversely disposed slot therein, a segmental shaped cam having a substantially radial cam surface and an arcuate slot, a trunnion on said cam at the vertex thereof and received in and slidable along the slot in said cross bar, a locking screw extending through both of said slots and clamping said cam in adjusted position and a cam follower carried by said apposing device and engaging said cam surface.

References Cited in the file of this patent

UNITED STATES PATENTS

| | | |
|---|---|---|
| 1,033,562 | Eltner | July 23, 1912 |
| 1,080,809 | Burch | Dec. 9, 1913 |
| 1,161,504 | Miller | Nov. 23, 1915 |